(12) United States Patent
Apichatachutapan et al.

(10) Patent No.: US 7,238,730 B2
(45) Date of Patent: *Jul. 3, 2007

(54) VISCOELASTIC POLYURETHANE FOAM

(75) Inventors: Wassana Apichatachutapan, Woodhaven, MI (US); Raymond Neff, Northville, MI (US); James Mullins, Lincoln Park, MI (US); Theodore M. Smiecinski, Woodhaven, MI (US); Thomas B. Lee, Southgate, MI (US)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/607,555

(22) Filed: Jun. 26, 2003

(65) Prior Publication Data

US 2004/0266897 A1    Dec. 30, 2004

(51) Int. Cl.
*C08G 18/28* (2006.01)

(52) U.S. Cl. ............ 521/174; 521/130; 521/132; 521/159; 521/164; 521/167

(58) Field of Classification Search ........ 521/132, 521/174, 130, 159, 164, 167
See application file for complete search history.

(56) References Cited

U.S. PATENT DOCUMENTS

| | | | |
|---|---|---|---|
| 3,405,077 A | 10/1968 | Pastor et al. | |
| 3,454,504 A * | 7/1969 | Murai et al. | 521/110 |
| 3,875,086 A | 4/1975 | Ramey et al. | |
| 4,129,697 A | 12/1978 | Schapel et al. | |
| 4,209,593 A | 6/1980 | Khanna | |
| 4,367,259 A | 1/1983 | Fulmer et al. | |
| 4,670,477 A * | 6/1987 | Kelly et al. | 521/52 |
| 4,950,695 A | 8/1990 | Stone | |
| 4,981,880 A | 1/1991 | Lehmann et al. | |
| 4,987,156 A | 1/1991 | Tozune et al. | |
| 5,420,170 A * | 5/1995 | Lutter et al. | 521/159 |
| 5,521,226 A * | 5/1996 | Bleys | 521/174 |
| 5,631,319 A | 5/1997 | Reese et al. | |
| 5,710,192 A | 1/1998 | Hernandez | |
| 5,919,395 A | 7/1999 | Bastin et al. | |
| 5,968,993 A | 10/1999 | Bleys | |
| 6,136,879 A * | 10/2000 | Nishida et al. | 521/174 |
| 6,204,300 B1 | 3/2001 | Kageoka et al. | |
| 6,391,935 B1 * | 5/2002 | Hager et al. | 521/170 |
| 6,495,611 B1 | 12/2002 | Arlt et al. | |
| 6,710,096 B2 * | 3/2004 | Neff et al. | 521/174 |

FOREIGN PATENT DOCUMENTS

| | | |
|---|---|---|
| EP | 0 778 301 A1 | 6/1997 |
| EP | 1 125 958 A1 | 8/2001 |
| EP | 1 178 061 A1 | 2/2002 |
| EP | 0 934 962 B1 | 6/2002 |
| WO | WO 01/25305 A1 | 4/2001 |
| WO | WO 01/32736 A1 | 5/2001 |

OTHER PUBLICATIONS

"NIAX Processing Additive DP-1022", Crompton OSI Specialties, pp. 1-6; Website:www.cromptoncorp.com, Jun. 2003.
"Novel MDI-Based Slabstock Foam Technology", pp. 63-68, Polyurethanes World Congress '97, Sep. 29-Oct. 1, 1997.
PCT International Search Report, PCT/EP2004/005460, 2004.

* cited by examiner

*Primary Examiner*—John M. Cooney, Jr.
(74) *Attorney, Agent, or Firm*—Fernando A. Borrego

(57) ABSTRACT

The subject invention provides a viscoelastic polyurethane foam being flame retardant and having a density of greater than two and a half pounds per cubic foot that comprises a reaction product of an isocyanate component, an isocyanate-reactive blend, and a chain extender. The isocyanate-reactive blend includes a first isocyanate-reactive component and a second isocyanate-reactive component. The first isocyanate-reactive component includes at least 60 parts by weight of ethylene oxide (EO) based on 100 parts by weight of the first isocyanate-reactive component and the second isocyanate-reactive component includes at most 30 parts by weight of EO based on 100 parts by weight of the second isocyanate-reactive component. The chain extender is reactive with the isocyanate component and has a backbone chain with from two to eight carbon atoms and is present in an amount of from 5 to 50 parts by weight based on 100 parts by weight of the foam. A composition useful in making the viscoelastic polyurethane foam is also disclosed.

25 Claims, No Drawings

VISCOELASTIC POLYURETHANE FOAM

BACKGROUND OF THE INVENTION

1. Field of the Invention

The subject invention relates to a viscoelastic polyurethane foam having a density of greater than two and a half pounds per cubic foot. More specifically, the viscoelastic polyurethane foam is flame retardant yet is formed of a composition that is substantially free of flame retardant.

2. Description of the Related Art

Various related art viscoelastic foams are a reaction product of an isocyanate component and an isocyanate-reactive blend. The blends typically include a first isocyanate-reactive component and a second isocyanate-reactive component. Examples of these related art foams are illustrated in U.S. Pat. No. 6,204,300; European Patent Application No. 1,178,061; and PCT Publication WO 01/32736.

Viscoelastic polyurethane foam is currently a niche application in the United States. It is used mainly in home and office furnishings, although a considerable amount of work has been conducted for automotive applications. The market for viscoelastic foam in home furnishings applications is currently estimated at about 25 million lbs/yr. in the United States. While the market size is now relatively small, it is growing at an estimated rate of about 20% to 30% per year.

Viscoelastic foam exhibits slow recovery, and thus high hysteresis, during a compression cycle. They also typically have low ball rebound values. These properties may result from either low airflow, as the recovery is limited by the rate of air re-entering the foam, or by the inherent properties of the foamed polymer. Polymer viscoelasticity is usually temperature-sensitive, and is maximized when the polymer undergoes a glass transition. For the viscoelastic foams currently studied, this glass transition results from vitrification of the polyether soft segment phase. By manipulating the structure and composition of the soft segment phase so that the glass transition temperature approximately coincides with the use temperature of the material, the viscoelastic nature of the material is maximized. When this material is used in a mattress or as a seat cushion, body heat from the user warms a portion of the material, thus softening it. The result is that the cushion molds to the shape of the body part in contact with it, creating a more uniform pressure distribution, which increases comfort. In addition, the remainder of the material remains hard, providing support. Thus, the temperature sensitivity increases the effective support factor of the material, allowing the construction of a mattress without metal springs.

The type of isocyanate component and the functionality and hydroxyl value of isocyanate-reactive component can be selected and formulated such that the glass transition occurs at a temperature at which the foam is used. Viscoelastic foams can also result from low airflow, or porosity. While most of the physical properties of viscoelastic foams resemble those of conventional foams, the resilience of viscoelastic foams is much lower, generally less than about 15%. Suitable applications for viscoelastic foam take advantage of its shape conforming, energy attenuating, and sound damping characteristics. One way to achieve these characteristics is to modify the amount and type of isocyanate-reactive components, isocyanate components, surfactants, catalysts, fillers as in U.S. Pat. No. 4,367,259, or other components, to arrive at foams having low resilience, good softness, and the right processing characteristics. Too often, however, the window for processing these formulations is undesirably narrow.

It is another aspect of these related art patents to produce flexible foam that is flame retardant. Typically, this has been accomplished by adding flame retardant to the compositions, as shown in U.S. Pat. No. 5,420,170. The '170 patent discloses a viscoelastic foam formed from an isocyanate-reactive blend. However, the '170 patent discloses adding flame retardant to make the resulting foam flame resistant. The flame retardant may compromise the integrity of the viscoelasticity, generates toxic chemicals if burned, and adds additional costs to production. However, others have attempted to produce the flame-retardant foam without employing any flame retardant in the composition. These approaches modify the amount of the isocyanate-reactive blend as shown in U.S. Pat. No. 6,495,611. The '611 patent discloses an isocyanate-reactive blend formed from hydrophilic compounds and hydrophobic compounds. The '611 patent also discloses utilizing flame retardant to increase the flame resistance, but it does not disclose the foam formed from the isocyanate-reactive blend as having any viscoelastic properties. Other related art foams are shown in U.S. Pat. Nos. 4,334,031; 4,374,935; and 4,568,702; PCT Publication WO 01/25305; European Patent No. 0934962; and European Patent Application Nos. 1125958 and 0778301. However, none of these related art patents discloses or suggests the unique and novel viscoelastic polyurethane foam of the subject invention.

Other approaches to making viscoelastic foam hinge on finding the right mixture of polyether polyols and other components. For example, U.S. Pat. No. 4,987,156 arrives at a soft, low-resilience foam with a mixture of high and low molecular weight polyols, each of which has a hydroxyl functionality of at least 2, and a plasticizer having a solidification point less than −20 degrees C. However, the '156 patent does not disclose a viscoelastic foam. U.S. Pat. No. 5,420,170 teaches use of a mixture that includes one polyol having a hydroxyl functionality of 2.3–2.8, and another polyol having functionality 2–3. U.S. Pat. No. 5,919,395 takes a similar approach with a polyol mixture that contains a 2500 to 6500 molecular weight polyol having a functionality of 2.5 to 6 and a rigid polyol having molecular weight 300 to 1000 and a functionality of 2.5 to 6. Neither the '170 patent nor the '395 patent disclose adding a chain extender to the composition to modify the glass transition temperature of the foams.

Another related art composition is disclosed in a paper titled "Novel MDI-Based Slabstock Foam Technology" by Lutter and Mente. The composition disclosed produces a viscoelastic foam from a isocyanate prepolymer, a flexible polyol, and an ethylene-oxide rich polyol. However, the paper does not disclose a chain extender present in significant amounts to produce the viscoelastic foam having the improved properties.

Monols, such as monofunctional alcohols, have also been included in flexible polyurethane foams for various reasons, but they have rarely been used in a viscoelastic foam such as U.S. Pat. No. 6,391,935. The '935 patent discloses a TDI based viscoelastic foam and it does not disclose a foam substantially free of TDI. The '935 patent also does not disclose using a chain extender to modify the glass transition temperature of the foam. Most references that include a monol teach compositions that form foams having high resilience, such as, U.S. Pat. Nos. 4,981,880; 3,875,086; and 3,405,077. However, none of these references disclose using a composition being substantially free of flame retardant and that includes chain extenders to produce the viscoelastic foam. Other references teach the use of low molecular weight monofunctional materials. For example, U.S. Pat.

No. 5,631,319 teaches use of a $C_1$–$C_{25}$ monoalcohol combined with a hydroxyketone in non-viscoelastic foam. U.S. Pat. No. 4,209,593 discloses a naphthol or other "bulky" monohydroxy compound to make an energy-absorbing foam. Both the '319 patent and the '593 do not disclose a viscoelastic foam according to the subject invention. Including low-molecular-weight (<1000), high hydroxyl number (>60 mg KOH/g) monols in viscoelastic foams adversely impacts important foam properties, particularly compression sets. In addition, any monol can remain largely unreacted, especially in a low-index formulation, resulting in a foam that is oily to the touch and provide poor "hand feel".

European Patent Application No. 0913414 teaches viscoelastic polyurethane foams that may contain a polyether monol. The monol, which has a molecular weight less than 1500, is used with a polyol that has a molecular weight greater than 1800. All of the examples produce a foam formed with a low isocyanate index of less than 90. U.S. Pat. No. 4,950,695 teaches use of a monofunctional alcohol or polyether to soften flexible polyurethane foams. The formulations also include a 2000 to 6500 molecular weight triol. The '695 patent does not disclose a viscoelastic foam that is flame retardant without additional flame retardant being added.

These foams are characterized by one or more inadequacies. Accordingly, it would be advantageous to provide a viscoelastic polyurethane foam that overcomes these inadequacies. Moreover, it would be advantageous to provide a viscoelastic foam that has a density from greater than two and a half pounds per cubic foot formed from a composition that is substantially free of flame retardant and that is a reaction product of an isocyanate component and an isocyanate-reactive blend, such that the foam is flame retardant.

BRIEF SUMMARY OF THE INVENTION AND ADVANTAGES

The subject invention provides a viscoelastic polyurethane foam having a density of greater than two and a half pounds per cubic foot. The foam is substantially free of flame retardant and comprises a reaction product of an isocyanate component substantially free of toluene diisocyanate, an isocyanate-reactive and a chain extender. The isocyanate-reactive blend includes a first isocyanate-reactive component having a weight average molecular weight of from 2500 to 4500, a hydroxyl number of from 30 to 50, and includes at least 60 parts by weight of ethylene oxide based on 100 parts by weight of the first isocyanate-reactive component, and a second isocyanate-reactive component having a weight-average molecular weight of from 1000 to 6000, a hydroxyl number of from 20 to 500, and includes at most 30 parts by weight of ethylene oxide based on 100 parts by weight of the second isocyanate-reactive component. The first isocyanate-reactive component is present in an amount of from 40 to 75 parts by weight and the second isocyanate-reactive component is present in an amount of from 25 to 60 parts by weight of based on 100 parts by weight of the isocyanate-reactive blend. The chain extender has a backbone chain with from two to eight carbon atoms and has a weight-average molecular weight of less than 1,000. The chain extender is present in an amount of from 5 to 50 parts by weight based on 100 parts by weight of the foam. The subject invention further includes a composition for forming the foam. The composition is a reaction product of the isocyanate component substantially free of toluene diisocyanate, the isocyanate-reactive blend, and the chain extender.

The viscoelastic polyurethane foam formed according to the subject invention is flame retardant even though the foam is substantially free of flame retardant components. The subject invention also produces the foam to have viscoelastic properties, while having reduced side effects. Therefore, the subject invention overcomes the inadequacies that characterize the related art.

DETAILED DESCRIPTION OF THE INVENTION

The subject invention provides a viscoelastic polyurethane foam having a density of greater than two and a half pounds per cubic foot. The foam of the subject invention is formed from a composition that is substantially free of flame retardant. It is to be appreciated that substantially free of flame retardant means less than 8 parts by weight based on 100 parts by weight of the composition and preferably less than 5 parts by weight based on 100 parts by weight of the composition. More preferably, the composition is completely free of flame retardant, i.e., 0 parts by weight based on 100 parts by weight of the component.

Various properties may be measured to determine whether the foam is viscoelastic. One property is a glass transition temperature of the foam. The glass transition temperature is determined through a dynamic mechanical thermal analysis (DMTA). The glass transition temperature is typically about 5 to 50 degrees Celsius, preferably 10 to 40 degrees Celsius, and more preferably 15 to 35 degrees Celsius. The DMTA also produces a peak tan delta that indicates the ability of the foam to dissipate energy during a compression cycle and is related to the recovery time of the foam. The peak tan delta is about 0.3 to 1.8, preferably 0.4 to 1.75, and more preferably 0.9 to 1.5. The glass transition temperature and the peak tan delta result from vitrification of a soft segment phase of the foam. Vitrification manipulates the structure and composition of the soft segment phase so that the glass transition temperature approximately coincides with the use temperature of the material, thereby maximizing the viscoelastic nature of the foam.

Additional properties that are advantageous, but not specifically related to the viscoelastic properties, include density, hardness, and recovery characteristics. A foam that has poor recovery characteristics will result in fingerprinting, i.e., fingerprints remain in the foam for long periods of time, such as greater than one minute after handling. Also, the foam formed from the subject invention should have a surface that is not tacky and that does not have any oily residue to the touch.

The foam of the subject invention is a reaction product of an isocyanate component substantially free of toluene diisocyanate with an isocyanate-reactive component and a chain extender. Those skilled in the art recognize that the foam is formed from a composition including the isocyanate component, the isocyanate-reactive component, and the chain extender. References herein below to amounts of these components may be to either the foam or the composition, since mass must be balanced throughout the reaction as is understood by those skilled in the art.

It is to be appreciated that substantially free of toluene diisocyanate means less than 8 parts by weight based on 100 parts by weight of the isocyanate component and preferably less than 5 parts by weight based on 100 parts by weight of the isocyanate component. More preferably, the isocyanate component is completely free of toluene diisocyanate, i.e., 0 parts by weight based on 100 parts by weight of the isocyanate component. However, it is to be understood that the foam may include a minimal amount of toluene diisocyanate, without effecting the viscoelastic performance characteristics of the polyurethane foam. An isocyanate index, as is known in the art, is the ratio of NCO groups in the isocyanate component to the OH groups in the isocyanate-reactive component. Preferably, the isocyanate index is from 75 to 110 and more preferably from 80 to 105. One skilled in the art would appreciate that the amount of isocyanate component can be determined by the isocyanate index in combination with the amount of isocyanate-reactive component present.

The isocyanate component is preferably selected from at least one of pure diphenylmethane diisocyanate and polymeric diphenylmethane diisocyanate. Pure diphenylmethane diisocyanate is understood by those skilled in the art to include diphenylmethane-2,4'-diisocyanate and diphenylmethane-4,4'-diisocyanate. Polymeric diphenylmethane diisocyanate is understood by those skilled in the art to include polycyclic polyisocyanates having 3-ring compounds, 4-ring compounds, 5-ring compounds, and higher homologs. In one embodiment, the pure diphenylmethane diisocyanate is present in an amount of from 50 to 99 parts by weight based on 100 parts by weight of the isocyanate component and the polymeric diphenylmethane diisocyanate is present in an amount from 1 to 50 parts by weight based on 100 parts by weight of the isocyanate component. The pure diphenylmethane diisocyanate includes the diphenylmethane-2,4'-diisocyanate present in an amount of from 1 to 45 parts by weight based on 100 parts by weight of the pure diphenylmethane diisocyanate and the diphenylmethane-4,4'-diisocyanate present in an amount from 55 to 99 parts by weight based on 100 parts by weight of the pure diphenylmethane diisocyanate. Examples of suitable isocyanates include, but are not limited to, LUPRANATE® MS, LUPRANATE® M20S, LUPRANATE® MI, and LUPRANATE® M10 LUPRANATE® M70 and LUPRANATE® M200 isocyanates, and No. 236 isocyanate, No. 233 isocyanate and No. 278 isocyanate, which are commercially available from BASF Corporation.

In another embodiment, the isocyanate component may include an isocyanate-terminated prepolymer being a reaction product of an isocyanate and a polyol. The polyol has a weight-average molecular weight greater than 1,000 and is present in an amount of from 1 to 20 parts by weight based on 100 parts by weight of the isocyanate component. The polyol may be formed from an initiator selected from at least one of ethylene glycol, diethylene glycol, propylene glycol, dipropylene glycol, butane diol, glycerol, trimethylolpropane, triethanolamine, pentaerythritol and sorbitol. The polyol may also be selected from a polyamine including, but not limited to, ethylene diamine, toluene diamine, diaminodiphenylmethane and polymethylene polyphenylene polyamines, and aminoalcohols. Examples of aminoalcohols include ethanolamine and diethanolamine, triethanolamine, and mixtures thereof. Examples of suitable polyols include, but are not limited to, PLURACOL® 2100, PLURACOL® 2115, PLURACOL® 2120, and PLURACOL® 2130, PLURACOL® 2145, PLURACOL® 593, PLURACOL® 945, PLURACOL® 1509, PLURACOL® 1051, PLURACOL® 1385, PLURACOL® 1538, PLURACOL® 381, PLURACOL® 726, PLURACOL® 220, PLURACOL® 718, PLURACOL® 1718, PLURACOL® 1441, PLURACOL® 1442, PLURACOL® 973, PLURACOL® 1117, PLURACOL® 1543, PLURACOL® 1365 Polyols, which are commercially available from BASF Corporation.

The isocyanate-reactive blend includes the first isocyanate-reactive component and the second isocyanate-reactive component. The isocyanate-reactive blend is reactive with the isocyanate component. The first isocyanate-reactive component has a weight-average molecular weight of from 2500 to 4500, preferably from 2500 to 4000. The first isocyanate-reactive component also has a hydroxyl number of from 30 to 50. The first isocyanate-reactive component includes at least 60 parts by weight of ethylene oxide (EO) based on 100 parts by weight of the first isocyanate-reactive component, preferably, at least 68 parts by weight of EO based on 100 parts by weight of the first isocyanate-reactive component, and more preferably 75 parts by weight EO based on 100 parts by weight of the first isocyanate-reactive component. In other words, those skilled in the art would consider the first isocyanate-reactive component EO-rich. In determining the amount of EO groups present in the isocyanate-reactive component, one skilled in the art would appreciate that this refers to groups attached to an initiator molecule, and does not include the initiator being present. It is known that the initiator molecule is necessary and must be present to form the isocyanate-reactive component.

The second isocyanate-reactive component has a weight-average molecular weight of from 1000 to 6000 and a hydroxyl number of from 20 to 500. The second isocyanate-reactive component includes at most 30 parts by weight of EO based on 100 parts by weight of the second isocyanate-reactive component. In other words, it is optional whether the second isocyanate-reactive component has any EO groups. In one embodiment, the second isocyanate-reactive component contains essentially no ethylene oxide, i.e., less than 0.5 parts by weight EO, based on 100 parts by weight of the second isocyanate-reactive component. More preferably, the second isocyanate-reactive component has 100 parts by weight of propylene oxide (PO) based on 100 parts by weight of the second isocyanate-reactive component, i.e. no EO groups. When determining the amount of PO groups present in the isocyanate-reactive component, one skilled in the art appreciates that this refers to groups extending from the initiator as described above for EO groups. Therefore, the flexible isocyanate-reactive component may have 100 parts PO, but may still include the initiator molecule that allows for formation of the flexible isocyanate-reactive component. The flexible isocyanate-reactive component may have at least three isocyanate-reactive groups.

The composition may also include a third isocyanate-reactive component particularly when the second isocyanate-reactive component contain essentially no EO groups. The third isocyanate-reactive component has a weight-average molecular weight of from 300 to 3000 and a hydroxyl number of from 40 to 500. The third isocyanate-reactive component includes at most 30 parts by weight of ethylene oxide based on 100 parts by weight of the third isocyanate-reactive component. In other words, it is optional whether the third isocyanate-reactive component has any EO groups. In one embodiment, the third isocyanate-reactive component includes 100 parts by weight of propylene oxide based on 100 parts by weight of the third isocyanate-reactive component. In another embodiment, the third isocyanate-reactive component includes at least 75 parts by weight of propylene oxide and less than 25 parts by weight of ethylene oxide based on 100 parts by weight of parts of the third isocyanate-reactive component. In one embodiment, the third isocyanate-reactive component has at least three isocyanate-reactive groups.

The first, second, and third isocyanate-reactive components may be selected from at least one of polyols, polyamines, and polyesters. More specifically, the polyol may be selected from at least one of ethylene glycol, diethylene glycol, propylene glycol, dipropylene glycol, butane diol, glycerol, trimethylolpropane, triethanolamine, pentaerythritol and sorbitol. Some polyamines include, but are not limited to, ethylene diamine, toluene diamine, diaminodiphenylmethane and polymethylene polyphenylene polyamines, and aminoalcohols. Examples of aminoalcohols include ethanolamine, diethanolamine, triethanolamine, and mixtures thereof.

The polyesters may be obtained by the condensation of appropriate proportions of glycols and higher functionality polyols with polycarboxylic acids. Still further suitable polyols include hydroxyl-terminated polythioethers, polyamides, polyesteramides, polycarbonates, polyacetals, polyolefins and polysiloxanes. Preferred polyols are the polyether polyols comprising ethylene oxide and/or propylene oxide units. Other polyols that may be used include dispersions or solutions of addition or condensation polymers in polyols of the types described above. Such modified polyols, often referred to as "polymer" polyols, have been fully described in the prior art and include products obtained by the in-situ polymerization of one or more vinyl monomers, for example styrene and acrylonitrile, in polymeric polyols, for example polyether polyols, or by the in situ reaction between a polyisocyanate and an amino- or hydroxy-functional compound, such as triethanolamine, in a polymeric polyol. Examples of suitable polyols include, but are not limited to, PLURACOL® 2100, PLURACOL® 380, PLURACOL® 2115, PLURACOL® 2120, and PLURACOL® 2130, PLURACOL® 2145, PLURACOL® 593, PLURACOL® 945, PLURACOL® 1509, PLURACOL® 1051, PLURACOL® 1385, PLURACOL® 1538, PLURACOL® 381, PLURACOL® 726, PLURACOL® 220, PLURACOL® 718, PLURACOL® 1718, PLURACOL® 1441, PLURACOL® 1442, PLURACOL® 973, PLURACOL® 1117, PLURACOL® 1543, PLURACOL® 1135, PLURACOL® 1365 Polyols, which are commercially available from BASF Corporation.

The first isocyanate-reactive component may be present in an amount of from 40 to 75 parts by weight, preferably from 45 to 70, and more preferably from 50 to 70, based on 100 parts by weight of the isocyanate-reactive blend. The second isocyanate-reactive component is present in an amount of from 25 to 60 parts by weight of based on 100 parts by weight of the isocyanate-reactive blend, preferably from 25 to 55, and more preferably from 25 to 50.

In the embodiments where the third isocyanate-reactive component is included, the second isocyanate-reactive component is present in an amount of from 20 to 45 parts by weight based on 100 parts by weight of the isocyanate-reactive blend and the third isocyanate-reactive component is present in an amount of from 5 to 30 parts by weight based on 100 parts by weight of the isocyanate-reactive blend. More preferably, the first isocyanate-reactive component is present in an amount of from 50 to 70 parts by weight based on 100 parts by weight of the isocyanate-reactive blend, the second isocyanate-reactive component is present in an amount of from 15 to 30 parts by weight based on 100 parts by weight of the isocyanate-reactive blend, and the third isocyanate-reactive component is present in an amount of from 15 to 30 parts by weight of based on 100 parts by weight of the isocyanate-reactive blend. In an embodiment having both the second isocyanate-reactive component and the third isocyanate-reactive component, they should be present in a combined amount of at least 25 parts by weight.

By modifying the amounts of the first, second, and third isocyanate-reactive components, the resultant foam can be flame retardant without any flame retardant whatsoever being added. By flame retardant, it is meant that the foam passes California Technical Bulletin 117 test (Cal-117). Cal-117 compliance is one of the requirements in California or as specified for foams used in residential furnishing. The first isocyanate-reactive component is hydrophilic, while the second and third isocyanate-reactive components are less hydrophilic than the first isocyanate-reactive component. In fact, the second and third isocyanate-reactive components may be considered hydrophobic. Hydrophilicity is determined by the amount of EO groups present in the isocyanate-reactive component. EO groups are more polar than PO groups and the EO groups are highly reactive as compared to the PO groups. Therefore, the subject invention has determined the amounts of EO and PO that result in the foam being flame retardant without the inclusion of any flame retardants whatsoever.

The composition further includes a chain extender having a backbone chain with from two to eight carbon atoms. The backbone chain is preferably from two to six carbons. The chain extender also has a weight-average molecular weight of less than 1,000. Preferably, the chain extender has a weight-average molecular weight of from 25 to 250 and more preferably less than 100. The chain extender may be present in an amount of from 5 to 50 part by weight based on 100 parts by weight of the composition and preferably from 5 to 30 parts by weight based on 100 parts by weight of the composition, and more preferably 5 to 15.

Preferably, the chain extender has two isocyanate-reactive groups and is a diol having hydroxyl groups as the isocyanate-reactive groups. More preferably, the chain extender is selected from at least one of 1,4-butanediol, 1,3-butanediol, 2,3-butanediol, 1,2-butanediol, 1,3-propylene glycol, and 1,5-pentanediol. The chain extender may also be selected from ethylene glycol, diethylene glycol, and polyethylene glycols having a weight-average molecular weight of up to 200. One suitable example of a commercially available chain extender is NIAX® DP-1022 from Crompton OSI.

The chain extender increases the glass transition temperature (Tg) of the foam. The chain extender and the isocyanate component react to form urethane hard segments within the foam that are incorporated into the soft segment phase and raise the soft segment Tg. This allows adjustment of Tg over a wide range of temperatures, independent of a density of the foam, which was not previously possible.

The subject invention provides flexibility to produce foams with a wide range of Tg's, by adjusting the chain extender level. It should be noted that in addition to adjusting the chain extender level, raising the isocyanate index also raises Tg. By simultaneously adjusting the isocyanate index, both the Tg and hardness can be independently varied.

The composition may further include a cross-linker. If included, the cross-linker is present in an amount of from 2 to 18 parts by weight based on 100 parts by weight, preferably from 4 to 16, more preferably from 4 to 15. Preferably, the cross-linker is an amine-based cross-linker and even more preferably, the amine-based cross-linker is selected from at least one of triethanolamine, diethanolamine, and ethylene diamine. It is to be appreciated by those skilled in the art that polyols, such as the third isocyanate-reactive component may be used as the cross-linker. One suitable cross-linker is PLURACOL® GP730 polyol available from BASF Corporation.

A monol may also be included in the composition and, if included, is present in an amount of from 1 to 15 parts by weight based on 100 parts by weight of the composition. Preferably, the monol is selected from at least one of benzyl alcohol, 2,2-dimethyl-1,3-dioxolane-4-methanol, and alcohol ethoxylate. Increasing the monol increases peak tan delta of the foam, while also softening the foam and slowing recovery. Tg also increases as the amount of the monol is increased as a result of the monol having a high hydroxy content. The high hydroxy content forms more urethane relative to the other resin side components, as is known by those skilled in the art. Examples of suitable monols include, but are not limited to, Solketal commercially available from Chemische Werke Hommel GmbH, ICONOL® DA-4, ICONOL® DA-6, MACOL® LA4, PLURAFAC® RA-40, PLURAFAC® LF4030, and INDUSTROL® TFA-8 all of which are commercially available from BASF Corporation.

The composition may include a cell opener having at least one of a paraffinic, cyclic, and aromatic hydrocarbon chain and, and, if included, is present in an amount of from 1 to 15 parts by weight based on 100 parts by weight of the composition, preferably from 1 to 12, and more preferably from 1 to 10. Preferably, the cell opener is mineral oil. However, other cell openers may be used which include, but are not limited to, silicone oils, corn oil, palm oil, linseed oil, soybean oil and defoamers based on particulates, such as silica. Foams formed with the cell opener were noticeably less tacky than those without the cell opener and these foams did not have an oily residue. Adjusting the amount of the cell opener effects the tendency of the foam to retain fingerprints. It has been determined that foams containing less than 2.5 parts by weight of the cell opener based on 100 parts by weight of the composition have fewer tendencies to retain fingerprints after handling. However, it is to be appreciated that modifying the other components of the composition may also effect fingerprinting. The cell opener increased the airflow through the foam and decreased the recovery time of the foam. It also lowered compression sets. An example of a suitable cell opener is, but is not limited to, white, light mineral oil commercial available from Mallinckrodt Chemicals.

The composition may also include other additives such as stabilizers as is known to those skilled in the art. Examples of suitable stabilizers include TEGOSTAB® B-8409 and TEGOSTAB® B-8418, both commercially available from Goldschmidt Chemical Corporation. Additionally, catalysts may also be used. Examples of suitable catalysts are, but not limited to, DABCO® 33LV and DABCO® BL-11 commercially available from Air Products and Chemicals, Inc. Blowing agents, such as water, may also be used in the subject invention to modify and control the density of the foam.

The foam formed from the composition according to the subject invention has a glass transition temperature of from 5 to 65 degrees Celsius and a tan delta peak of from 0.75 to 1.75. As described above, the amount of the chain extender present in the composition effects the temperature at which the glass transition occurs and also effects the tan delta peak of the foam. When the chain extender is present in the preferred amounts described above, the glass transition temperature of the foam is from 15 to 35 degrees Celsius and the tan delta peak of the foam is from 0.9 to 1.5. It is preferable to select, formulate, and modify the amount of chain extender and monol such that the foam has the glass transition at a temperature that the foam is to be used. This is particularly important when considering that the foam may be used in areas having varying temperatures and it might be advantageous to modify the composition so that the foam is better suited for the specific temperatures. The "use temperature" may be based upon body temperature, time of year, geographic location, or all of the above.

EXAMPLES

A viscoelastic polyurethane foam is formed according to the subject invention. Each of the components forming the composition is listed in parts by weight, unless otherwise indicated. As set forth above, the isocyanate index is the ratio of —NCO groups in the isocyanate component to the —OH groups in the isocyanate-reactive blend.

TABLE 1

Formulations of Viscoelastic Polyurethane Foams

| | Example 1 | Example 2 | Example 3 | Example 4 | Example 5 | Example 6 | Comparative Example 1 |
|---|---|---|---|---|---|---|---|
| First Isocyanate-reactive Component | 70.00 | 70.00 | 60.00 | 70.00 | 60.00 | 60.00 | 90.00 |
| Second Isocyanate-reactive Component A | 15.00 | 15.00 | 40.00 | 0.00 | 0.00 | 0.00 | 0.00 |
| Second Isocyanate-reactive Component B | 0.00 | 0.00 | 0.00 | 30.00 | 40.00 | 20.00 | 0.00 |
| Second Isocyanate-reactive Component C | 0.00 | 0.00 | 0.00 | 0.00 | 0.00 | 0.00 | 12.00 |
| Third Isocyanate-reactive Component A | 15.00 | 15.00 | 0.00 | 0.00 | 0.00 | 0.00 | 0.00 |
| Third Isocyanate-reactive Component B | 0.00 | 0.00 | 0.00 | 0.00 | 0.00 | 20.00 | 0.00 |
| Third Isocyanate-reactive Component C | 0.00 | 0.00 | 0.00 | 0.00 | 0.00 | 0.00 | 10.00 |

TABLE 1-continued

Formulations of Viscoelastic Polyurethane Foams

|  | Example 1 | Example 2 | Example 3 | Example 4 | Example 5 | Example 6 | Comparative Example 1 |
|---|---|---|---|---|---|---|---|
| Water | 1.33 | 1.33 | 1.33 | 1.43 | 1.43 | 1.23 | 1.40 |
| Chain Extender | 12.00 | 12.00 | 12.00 | 12.00 | 11.00 | 12.00 | 12.00 |
| Additive | 0.50 | 0.50 | 1.50 | 0.40 | 0.40 | 0.50 | 3.00 |
| Catalyst A | 0.60 | 0.60 | 1.00 | 0.60 | 0.60 | 0.60 | 0.20 |
| Catalyst B | 0.10 | 0.10 | 0.05 | 0.10 | 0.10 | 0.10 | 0.00 |
| Catalyst C | 0.00 | 0.00 | 0.00 | 0.00 | 0.00 | 0.00 | 0.25 |
| Monol A | 0.00 | 3.00 | 0.00 | 1.00 | 1.00 | 0.00 | 0.00 |
| Monol B | 0.00 | 0.00 | 4.00 | 0.00 | 0.00 | 0.00 | 0.00 |
| Monol C | 0.00 | 0.00 | 0.00 | 0.00 | 0.00 | 0.00 | 0.00 |
| Monol D | 0.00 | 0.00 | 0.00 | 0.00 | 0.00 | 0.00 | 0.00 |
| Monol E | 0.00 | 0.00 | 0.00 | 0.00 | 0.00 | 2.00 | 0.00 |
| Monol F | 0.00 | 0.00 | 0.00 | 0.00 | 0.00 | 0.00 | 8.00 |
| Isocyanate Component A | 63.01 | 64.02 | 59.07 | 59.30 | 57.02 | 57.28 | 0.00 |
| Isocyanate Component B | 0.00 | 0.00 | 0.00 | 0.00 | 0.00 | 0.00 | 88.5 |
| Isocyanate Index | 90.00 | 90.00 | 90.00 | 90.00 | 90.00 | 90.00 | 95.00 |

Referring to the above Table, the first isocyanate-reactive component is PLURACOL® 593 Polyol from BASF Corporation having a functionality of 2.96, a weight-average molecular weight of 3606, hydroxyl number of 46, and 75% EO-25% PO heteric. The second isocyanate-reactive component A is PLURACOL® 726 Polyol from BASF Corporation having a functionality of 2.71, a weight-average molecular weight of 2637, hydroxyl number of 57.6, and 100% PO. The second isocyanate-reactive component B is PLURACOL® 1538 Polyol from BASF Corporation having a functionality of 2.8, a weight-average molecular weight of about 3000, hydroxyl number of 56, and 6% EO-94% PO heteric. The second isocyanate-reactive component C is PLURACOL® 355 Polyol from BASF Corporation having a functionality of 3.96, a weight-average molecular weight of 491, hydroxyl number of 453, and 10% EO-77.9% PO. The third isocyanate-reactive component A is PLURACOL® GP730 Polyol from BASF Corporation having a functionality of 2.99, a weight-average molecular weight of 730, hydroxyl number of 230, and 100% PO. The third isocyanate-reactive component B is a polyol having an hydroxyl number of 56.3, a functionality of about 2.8, a weight-average molecular weight of about 3,000, and having about 12% EO capping. The Polyol is formed from a glycerine initiator. The third isocyanate-reactive component C is PLURACOL® 220 Polyol from BASF Corporation having a functionality of 3, a weight-average molecular weight of 6000, hydroxyl number of 25, and 5% EO-95% PO heteric. The chain extender is NIAX® DP-1022 from Crompton OSI. The additive is TEGOSTAB® B-8409 from Goldschmidt Chemical Corporation. Catalyst A is DABCO® 33LV from Air Products and Chemicals, Inc., Catalyst B is DABCO® BL-11 from Air Products and Chemicals, Inc., and Catalyst C is NIAX® A-1 from Crompton OSI. Monol A is ICONOLTM DA-4 from BASF Corporation, Monol B is INDUSTROL® TFA-8, Monol C is PLURAFLAC® RA40, and Monol D is SOLKETAL® from BASF Corporation, Monol E is MACOL® LA-4 from BASE Corporation, and Monol F is benzyl alcohol. Isocyanate component A is No. 278 Isocyanate from BASF Corporation. Isocyanate component B is 48.7 parts by weight of Isocyanate No. 233, 31.6 parts by weight of LUPRANATE® MI, and 19.7 parts by weight LUPRANATE® M20 S Isocyanates, each commercially available from BASF Corporation.

The foams were prepared in hand-mixes using standard hand-mix techniques for foams as is known to those skilled in the art. In the hand mixtures, all components, except isocyanate, were added into a 64-oz. paper cup and pre-blended for 48 seconds using a 3-inch diameter circular mix blade rotating at 2200 rpm. The isocyanate component was then added, then the mixture was mixed for 8 seconds. The mixture was then poured into a 5-gallon bucket and allowed to cure for at least 30 minutes at room temperature. The foams were then placed into an oven set at 250° F. for 16 hours. Physical property tests were conducted in accordance with the ASTM references listed below.

Various physical properties were measured for the foam produced in accordance with the subject invention. Density was measured according to ASTM D1622. Indentation force deflection (IFD) was measured at 25%, 50%, 65%, and 25% Return according to ASTM D3574. Block tear was measured in accordance with ASTM D1938. Tensile strength was determined in accordance with ASTM D3574. Falling ball resilience was measured in accordance with ASTM D3574. Frazier air flow was determined in accordance with ASTM D737. Compression sets were determined in accordance with ASTM D395 and heat aging was determined in accordance with D3574. The DMTA was measured in accordance with D4065. DMTA was conducted using a Rheometrics RSA II. Disk-shaped samples 2 cm wide by ½ inch thick were die cut for the measurements. A strain of 0.5%, frequency 1 Hz and heating rate 5 °C./min were used.

Table 2 sets forth the physical properties for Examples 1-6 and the Comparative Example in Table 1. Additionally, a sag factor, which is the indentation force deflection at 65% divided by the indentation force deflection at 25%, was measured. The recovery for the foam was determined by dividing the height of the foam after being subjected to a 25% IFD divided by the height while being subjected to the 25% IFD multiplied by 100. A Compression Force Deflection (CFD) retention after humid aging was also measured, which is [100-((original CFD at 50%-humid aged CFD at 50%)/original CFD at 50%)×100].

TABLE 2

Properties for Foam formed from the Formulations of Table 1

| | Example 1 | Example 2 | Example 3 | Example 4 | Example 5 | Example 6 | Comparative Example 1 |
|---|---|---|---|---|---|---|---|
| Physical Properties | | | | | | | |
| Recovery time, sec | 6.00 | 8.00 | 40.00 | 8.00 | 21.00 | 8.00 | 16.00 |
| Glass Transition Temp, °C. | 28.00 | 26.00 | 34.00 | 22.00 | 29.00 | 27.00 | 22.50 |
| Peak Tan δ | 1.17 | 1.20 | 1.20 | 0.97 | 0.90 | 1.07 | 1.22 |
| Core density, pcf | 5.57 | 5.61 | 5.92 | 5.51 | 5.53 | 6.45 | 6.20 |
| Original 25% IFD, lb | 37.35 | 28.79 | 27.52 | 35.41 | 34.00 | 28.92 | N/A |
| Original 65% IFD, lb | 73.90 | 58.78 | 55.84 | 76.42 | 76.74 | 65.77 | N/A |
| Original 25% RT IFD, lb | 33.83 | 25.10 | 22.54 | 31.40 | 28.94 | 24.18 | N/A |
| Sag Factor | 1.98 | 2.04 | 2.03 | 2.16 | 2.26 | 2.27 | N/A |
| Recovery, % | 90.57 | 87.17 | 81.93 | 88.70 | 85.11 | 83.62 | N/A |
| Hysteresis loss at 65%, % | 32.60 | 36.90 | 45.90 | 34.00 | 47.00 | 53.84 | N/A |
| Resilience, % | 1.00 | 1.00 | 2.00 | 2.00 | 3.00 | 1.00 | 2.00 |
| Frazier Air flow, cfm/ft2 (crushed) | 1.41 | 1.42 | 2.54 | 2.09 | 1.17 | 1.06 | 5.40 |
| Dow Air flow, cfm | <0.05 | <0.05 | 0.05 | 0.06 | <0.05 | <0.05 | 0.09 |
| Orig. peak tensile, psi | 17.13 | 15.10 | 22.52 | 15.58 | 18.51 | 20.46 | 11.90 |
| Orig. break elongation, % | 150.28 | 166.63 | 188.00 | 167.00 | 182.00 | 198.00 | 160.50 |
| Original block tear, ppi | 2.43 | 2.34 | 2.80 | 2.00 | 2.40 | 2.70 | 1.40 |
| Compression Force Deflection (CFD) at 50%, psi | 0.71 | 0.55 | 0.55 | 0.71 | 0.71 | 0.61 | 0.41 |
| Heat Aging at 284° F., 22 hours | | | | | | | |
| Heat aged peak tensile, psi | 27.04 | 18.23 | 23.52 | 14.96 | 19.58 | 16.82 | 11.30 |
| Heat aged break elongation, % | 176.71 | 179.47 | 192.00 | 157.00 | 188.00 | 186.85 | N/A |
| Compression Sets for 22 Hrs at 158° F. | | | | | | | |
| 50% Deflection | 0.44 | 0.38 | 0.37 | 0.00 | 0.45 | 0.97 | 2.00 |
| 90% Deflection | 0.29 | 0.46 | 0.74 | 0.65 | 1.37 | 4.85 | 2.00 |
| Humid Aging of Compression Set for 3 Hrs at 220° F. | | | | | | | |
| 50% Deflection | 0.37 | 1.35 | 0.93 | 0.55 | 1.11 | 0.36 | 5.00 |
| 90% Deflection | 0.20 | 1.44 | 1.08 | 2.17 | 1.88 | 2.57 | 6.00 |
| Humid Aging of CFD for 3 Hrs at 220° F. | | | | | | | |
| Humid aged 50% CFD, psi | 0.59 | 0.46 | 0.55 | 0.60 | 0.60 | 0.53 | N/A |
| % CFD retention after humid aging | 83.10 | 83.64 | 87.00 | 85.00 | 85.00 | 87.00 | 46.00 |
| Flammability Properties | | | | | | | |
| Cal. T.B. 117 Vertical Open Flame | PASS | PASS | PASS | PASS | PASS | PASS | FAIL |
| Afterflame, Sec. (ave.) | 3.00 | 2.40 | 5.00 | 3.90 | 1.80 | 2.40 | 5.00 |
| Char Length, In. (ave.) | 0.30 | 0.40 | 0.80 | 0.50 | 0.40 | 0.40 | 46.00 |
| Afterflame, Sec. (ave.) Heat Aged | 4.20 | 3.60 | 2.80 | 2.60 | 2.60 | 1.80 | 5.00 |
| Char Length, In. (ave.) Heat Aged | 0.30 | 0.30 | 0.80 | 0.40 | 0.50 | 0.50 | 46.00 |
| Cal. T.B. 117 Cigarette Smoldering | PASS | PASS | PASS | PASS | PASS | PASS | PASS |
| % Wt. Retained (min. 80.0%) | 99.65 | 99.60 | 99.4 | 99.40 | 99.40 | 99.40 | N/A |

Referring to Table 2, all of the foams of Examples 1–6 of the subject invention pass the California Technical Bulletin 117-flammability test without any additional flame retardant. Comparative Example 1 does not pass the California Technical Bulletin 117-flammability test. Examples 1–6 have the second and third isocyanate-reactive component present in an amount of at least 30 parts by weight, whereas Comparative Example 1 only included 22 parts by weight of the second and third isocyanate-reactive component which is insufficient to make the foam flame retardant. Another possible reason that Comparative Example 1 did not pass Cal-117 is that it includes PLURACOL® 355 and PLURACOL® 220, whereas Examples 1-6 only use PLURACOL® 355 as the third isocyanate-reactive component with a different second isocyanate-reactive component.

Table 3 illustrates properties for a commercially available viscoelastic foam as Comparative Example 2.

TABLE 3

Comparative Properties for Commercial Viscoelastic Foam

| | Comparative Example 2 |
|---|---|
| Physical Properties | |
| Recovery time, sec | 9.00 |
| Glass Tansition Temp, ° C. | 28.00 |
| Peak Tan δ | 1.53 |
| Core density, pcf | 5.50 |
| Original 25% IFD, lb | 14.30 |
| Original 65% IFD, lb | 35.40 |
| Original 25% RT IFD, lb | 12.90 |
| Sag Factor | 2.51 |
| Recovery, % | 91.20 |
| Hysteresis loss at 65%, % | 71.90 |
| Resilience, % | 1.00 |
| Frazier Air flow, cfm/ft2 (crushed) | 1.00 |
| Dow Air flow, cfm | 0.10 |
| Orig. peak tensile, psi | 9.00 |
| Orig. break elongation, % | 175.00 |
| Original block tear, ppi | 1.00 |
| Compression Force Deflection at 50%, psi | 0.28 |
| Heat Aging at 284° F., 22 hours | |
| Heat aged peak tensile, psi | 10.00 |
| Heat aged break elongation, % | 156.00 |
| Compression Sets 22 Hrs at 158° F. | |
| 50% Deflection | 20.00 |
| 90% Deflection | 65.00 |
| Humid Aging of Compression Set for 3 Hrs at 220° F. | |
| 50% Deflection | 14.00 |
| 90% Deflection | 51.00 |
| Humid Aging of Compression Force Deflection 3 Hrs at 220° F. | |
| Humid aged 50% CFD, psi | 0.18 |
| % CFD retention after humid aging | 64.29 |
| Flammability Properties | |
| Cal. T.B. 117 Vertical Open Flame | PASS |
| Afterflame, Sec. (ave.) | 7.20 |
| Char Length, In. (ave.) | 0.90 |
| Afterflame, Sec. (ave.) Heat Aged | 0.90 |
| Char Length, In. (ave.) Heat Aged | 0.50 |
| Cal. T.B. 117 Cigarette Smoldering | PASS |
| % Wt. Retained (min. 80.0%) | 99.60 |

Comparing the results for Examples 1–6 in Table 2 with the results for Comparative Example 2, they each pass the California Technical Bulletin 117-flammability test. However, Comparative Example 2 includes additional flame retardant, whereas Examples 1–6 do not include additional flame retardant. The subject invention foams also passes the flammability test without additional flame retardant, whereas Comparative Example 2 requires additional flame retardant to the pass the flammability test. Examples 1–6 and Comparative Example 2 also each have similar viscoelastic properties as evidenced by the similar glass transition temperatures. On the other hand, Examples 1–6 have improved tensile, tear, and compression set properties compared to Comparative Example 2. Therefore, the viscoelastic polyurethane foams formed according to subject invention have similar viscoelastic properties and improved physical properties compared to the Comparative Example 2.

Obviously, many modifications and variations of the present invention are possible in light of the above teachings. The invention may be practiced otherwise than as specifically described within the scope of the appended claims.

What is claimed is:

1. A viscoelastic polyurethane foam comprising a reaction product of:
    an isocyanate component substantially free of toluene diisocyanate and comprising pure diphenylmethane diisocyanate in an amount of from 50 to 99 parts by weight based on 100 parts by weight of said isocyanate component and polymeric diphenylmethane diisocyanate in an amount from 1 to 50 parts by weight based on 100 parts by weight of said isocyanate component,
    an isocyanate-reactive blend comprising,
    a first isocyanate-reactive component having a weight-average molecular weight of from 2500 to 4500, a hydroxyl number of from 30 to 50, and comprising at least 60 parts by weight of ethylene oxide based on 100 parts by weight of said first isocyanate-reactive component, and
    a second isocyanate-reactive component having at least three isocyanate-reactive groups, a weight-average molecular weight of from 1000 to 6000, a hydroxyl number of from 20 to 500, and comprising at most 30 parts by weight of ethylene oxide based on 100 parts by weight of said second isocyanate-reactive component,
    wherein said first isocyanate-reactive component is used in an amount of from 40 to 75 parts by weight and said second isocyanate-reactive component is used in an amount of from 25 to 60 parts by weight, both-based on 100 parts by weight of said isocyanate-reactive blend;
    a chain extender having a weight-average molecular weight of from 25 to 250 and having a backbone chain with from two to eight carbon atoms and having two isocyanate-reactive groups, wherein said chain extender is used in an amount of from 5 to 30 parts by weight based on 100 parts by weight of said foam; and
    wherein said foam has a glass transition temperature of from 5 to 65 degrees Celsius and a tan delta peak of from 0.75 to 1.75; and
    wherein said foam has a density of greater than two and a half pounds per cubic foot and is substantially free of flame retardant and passes California Technical Bulletin 117-Flammability test as a result of said isocyanate component and said isocyanate-reactive blend.

2. A viscoelastic polyurethane foam as set forth in claim 1 further comprising a third isocyanate-reactive component having a weight-average molecular weight of from 300 to 3000, a hydroxyl number of from 40 to 500, and comprising from 0.5 to 20 pans by weight of ethylene oxide based on 100 parts by weight of said third isocyanate-reactive component and wherein said second isocyanate-reactive component is essentially all propylene oxide.

3. A viscoelastic polyurethane foam as set forth in claim 2 wherein said second isocyanate-reactive component is used in an amount of from 20 to 45 parts by weight based on 100 parts by weight of said isocyanate-reactive blend and said third isocyanate-reactive component is used in an amount of from 5 to 30 parts by weight based on 100 parts by weight of said isocyanate-reactive blend.

4. A viscoelastic polyurethane foam as set forth in claim 3 wherein said third isocyanate-reactive component includes at least three isocyanate-reactive groups.

5. A viscoelastic polyurethane foam as set forth in claim 4 wherein said isocyanate-reactive blend is further defined as including from 50 to 70 parts by weight of said first isocyanate-reactive component, from 15 to 30 parts by weight of said second isocyanate-reactive, and from 15 to 30 parts by weight of said third isocyanate-reactive component, based 100 parts by weight of said isocyanate-reactive blend.

6. A viscoelastic polyurethane foam as set forth in claim 1 wherein said first isocyanate-reactive component has a weight-average molecular weight of from 2500 to 4000 and at least 75 parts by weight of ethylene oxide based on 100 parts by weight of said first isocyanate-reactive component.

7. A viscoelastic polyurethane foam as set forth in claim 1 wherein said second isocyanate-reactive component has 100 parts by weight of propylene oxide based on 100 parts by weight of said second isocyanate-reactive component.

8. A viscoelastic polyurethane foam as set forth in claim 2 wherein said third isocyanate-reactive component comprises at least 75 parts by weight of propylene oxide and less than 25 parts by weight of ethylene oxide based on 100 parts by weight of said third isocyanate-reactive component.

9. A viscoelastic polyurethane foam as set forth in claim 1 wherein said isocyanate-reactive blend comprises from 50 to 70 parts by weight of said first isocyanate-reactive component and from 25 to 50 parts by weight of said second isocyanate-reactive component based 100 parts by weight of said isocyanate-reactive blend.

10. A viscoelastic polyurethane foam as set forth in claim 1 wherein said chain extender has a weight-average molecular weight of less than 100.

11. A viscoelastic polyurethane foam as set forth in claim 1 wherein said chain extender is a diol having hydroxyl groups as said isocyanate-reactive groups.

12. A viscoelastic polyurethane foam as set forth in claim 1 wherein said chain extender is further defined as having from two to six carbon atoms.

13. A viscoelastic polyurethane foam as set forth in claim 1 wherein said chain extender is selected from at least one of 1,4-butanediol, 1,3-butanediol, 2,3-butanediol, 1,2-butanediol, 1,3-propylene glycol, and 1,5-pentanediol.

14. A viscoelastic polyurethane foam as set forth in claim 12 wherein said chain extender is selected from at least one of ethylene glycol, diethylene glycol, and polyethylene glycols having a weight-average molecular weight of up to 200.

15. A viscoelastic polyurethane foam as set forth in claim 1 wherein said foam has a glass transition temperature of from 15 to 35 degrees Celsius and a tan delta peak of from 0.9 to 1.5.

16. A viscoelastic polyurethane foam as set forth in claim 1 wherein said pure diphenylmethane diisocyanate is further defined as:

diphenylmethane-2,4'-diisocyanate in an amount of from 1 to 45 parts by weight based on 100 parts by weight of said pure diphenylmethane diisocyanate; and diphenylmethane-4,4'-diisocyanate in an amount from 55 to 99 parts by weight based on 100 parts by weight of said pure diphenylmethane diisocyanate.

17. A viscoelastic polyurethane foam as set forth in claim 1 wherein said isocyanate component further includes an isocyanate-terminated prepolymer.

18. A viscoelastic polyurethane foam as set forth in claim 17 wherein a polyol having a weight-average molecular weight greater than 1,000 is used in an amount of from 1 to 20 parts by weight based on 100 parts by weight of said isocyanate component to form said prepolymer.

19. A viscoelastic polyurethane foam as set forth in claim 1 wherein said reaction product further comprises a cross-linker in an amount of from 2 to 18 parts by weight based on 100 parts by weight of said foam.

20. A viscoelastic polyurethane foam as set forth in claim 19 wherein said cross-linker is further defined as an amine-based cross-linker.

21. A viscoelastic polyurethane foam as set forth in claim 20 wherein said amine-based cross-linker is selected from at least one of triethanolamine, diethanolamine, and ethylene diamine.

22. A viscoelastic polyurethane foam as set forth in claim 1 wherein said reaction product further comprises a monol in an amount of from 1 to 15 parts by weight based on 100 parts by weight of said foam.

23. A viscoelastic polyurethane foam as set forth in claim 22 wherein said monol is selected from at least one of benzyl alcohol, 2,2-dimethyl-1,3-dioxolane-4-methanol, and alcohol ethoxylate.

24. A viscoelastic polyurethane foam as set forth in claim 1 wherein said reaction product further comprises a cell opener having at least one of a paraffinic, cyclic, and aromatic hydrocarbon chain in an amount of from 1 to 15 parts by weight based on 100 parts by weight of said foam.

25. A viscoelastic polyurethane foam as set forth in claim 24 wherein said cell opener is mineral oil.

* * * * *